(12) United States Patent
Shinada

(10) Patent No.: US 7,224,385 B2
(45) Date of Patent: May 29, 2007

(54) VIDEO CAMERA WITH MULTIPLE MICROPHONES AND AUDIO PROCESSOR PRODUCING ONE SIGNAL FOR RECORDING

(75) Inventor: Akira Shinada, Tokyo (JP)

(73) Assignee: Sony Corporation (JP)

( * ) Notice: Subject to any disclaimer, the term of this patent is extended or adjusted under 35 U.S.C. 154(b) by 582 days.

(21) Appl. No.: 10/128,737

(22) Filed: Apr. 23, 2002

(65) Prior Publication Data

US 2002/0176004 A1 Nov. 28, 2002

(30) Foreign Application Priority Data

Apr. 27, 2001 (JP) ............................ P2001-130883

(51) Int. Cl.
*H04N 5/225* (2006.01)
*H04R 5/00* (2006.01)
*H04N 5/91* (2006.01)
*H04N 7/00* (2006.01)

(52) U.S. Cl. .................. 348/207.99; 381/23; 386/96

(58) Field of Classification Search ........... 348/207.99, 348/333.06, 423.1; 381/1, 26, 61, 91, 92, 381/122, 306, 307, 192, 18, 23; 386/95–99, 386/105

See application file for complete search history.

(56) References Cited

U.S. PATENT DOCUMENTS

| | | | | |
|---|---|---|---|---|
| 5,677,752 | A | * | 10/1997 | Miyamori et al. ............. 352/5 |
| 5,722,069 | A | * | 2/1998 | Donner ....................... 455/418 |
| 6,160,953 | A | * | 12/2000 | Fuchigami et al. ......... 386/105 |
| 6,240,189 | B1 | * | 5/2001 | Aylward ....................... 381/18 |
| 6,507,659 | B1 | * | 1/2003 | Iredale et al. ................. 381/26 |
| 2001/0055071 | A1 | * | 12/2001 | Kawai et al. .......... 348/333.06 |

* cited by examiner

*Primary Examiner*—Vivek Srivastava
*Assistant Examiner*—Kelly Jerabek
(74) *Attorney, Agent, or Firm*—Lerner, David, Littenberg, Krumholz & Mentlik, LLP

(57) ABSTRACT

A video camera capable of recording and/or reproducing multiple channel audio signals and video signals simultaneously in a single recording medium in such a manner as to reproduce omnidirectional ambient sounds as surround sound. The video camera includes a number of microphones and records first multiple audio signals obtained by processing the audio signals outputted from the microphones to generate the multiple channel audio signals and also records a second audio signal obtained by processing all of the audio signals outputted from the microphones in the recording medium simultaneously with the video signals, so that the first multiple audio signals and the second audio signal can be reproduced independently of each other.

1 Claim, 2 Drawing Sheets

VIDEO CAMERA WITH MULTIPLE MICROPHONES AND AUDIO PROCESSOR PRODUCING ONE SIGNAL FOR RECORDING

BACKGROUND OF THE INVENTION

The present invention relates to a video camera capable of recording and/or reproducing audio signals and video signals simultaneously, and more particularly to a portable video camera of such type.

It is general that a video camera is customary adapted for recording both video and audio signals simultaneously in a recording medium such as a magnetic tape for example, and with regard to sounds, improved devices having a stereophonic audio recording function with two microphones are currently popularized. Therefore, when the sounds and images recorded by a video camera are reproduced by the use of, for example, a home television receiver equipped with a color cathode ray tube as a monitor, it may be said that stereo recording is superior to monaural one in achieving enhanced vivid reproduction with the live-performance reality.

However, in any of the conventional video cameras known heretofore, even a type employing a plurality of microphones for stereophonic audio recording is capable of executing merely two-channel sound reproduction, and it is becoming difficult to comply with the predicted demand for improvements relative to attaining the live-performance reality.

Apart from a conventional large-sized theater where images and sounds shot and recorded in a silver chloride film are reproduced by means of a projector, there has been contrived a mini-theater where a magnetic tape is used for shooting and recording by a video camera, and reproduction is executed by a video projector with a video tape recorder or the like, and the latter is currently on the increase. It is observed now that such mini-theater system tends to be popular for home use as well, and the demand for enjoying the reproduced images with the enhanced live-performance reality of the sounds is also coming to be high in general homes.

More particularly, it is becoming possible that images and sounds recorded in a magnetic tape or the like by an ordinary portable video camera can be enjoyed by the use of a deluxe acoustic apparatus with a video projector including a video tape recorder and so forth and a screen or a large-sized monitor (e.g., a display unit employing a plasma liquid crystal device).

Even if the image is reproduced to be dimensionally great on a screen or a large-sized monitor, in case the stereophonic sound reproduction is executed merely in two channels, lack of the live-performance reality is unavoidable and therefore complete satisfaction is not attained. For example, if the sport activity of a user's child in a children's athletic meeting or the like has been shot dynamically, in case the actual sound recording is merely stereophonic, it is impossible to vividly reproduce the back or ambient cheering shout, hurrah, roar and so forth with actual feeling of the live-performance reality. Consequently, it is difficult to completely utilize the full function of at least the sound reproduction line in a home video/audio reproducing apparatus, hence causing some restriction in attainment of sufficient enjoyment.

SUMMARY OF THE INVENTION

The present invention has been accomplished in order to solve the problems mentioned above. And it is an object of the invention to provide an improved video camera which is capable of recording and/or reproducing audio signals of plural channels and video signals simultaneously in a single recording medium, wherein omnidirectional ambient sounds are recordable in a manner to be reproduced as surround sounds.

According to one aspect of the present invention, there is provided a video camera wherein a plurality of first audio signals obtained by processing the output audio signals from plural microphones to generate audio signals of plural channels, and a second audio signal obtained by processing the audio signals of entire channels outputted from the plural microphones to generate an audio signal of one channel, are recorded simultaneously with video signals in such a manner that the plural first audio signals and the second audio signal are reproducible independently of each other.

In this video camera, therefore, the second audio signal of one channel obtained by processing the plural-channel audio signals outputted from the plural microphones can be reproduced independently and separately from the first audio signals of plural channels obtained by processing the output signals from the microphones, so that in a reproduction mode, the sounds can be reproduced together with the video signals vividly with the live-performance reality. Consequently, the dynamic sport action of a user's child for example in a children's athletic meeting or the like can be reproduced with the vivid live-performance reality together with the surround sounds including the back and ambient cheering shout, hurrah, roar and so forth in addition to the omnidirectional sounds, whereby it is rendered possible to fully enjoy the reproduced images and sounds while completely utilizing the function of the home video/audio reproducing apparatus.

It is preferred that the second audio signal, which is obtained by processing the audio signals of the entire channels outputted from the plural microphones, is reproduced as a second audio signal of one channel by extracting only the bass components of the entire-channel signals and then combining the extracted bass components. In this case, it becomes possible to catch the ambient omnidirectional sounds separately from the discrete directional sounds without the necessity of any exclusive surround sound recording microphone. Consequently, in a reproduction mode, the surround sounds can be reproduced from independent speakers with the emphasized bass.

Fundamentally the subject of the present invention is a video camera capable of recording and/or reproducing both audio and video signals simultaneously in a single recording medium, no matter whether the camera is intended for business use or consumer use. Although an imaging means is required inevitably for video recording, the means may comprise an image pickup tube or a solid-state imaging device such as a CCD (charge-coupled device).

A current typical example relative to recording and reproduction of audio and video signals employs a magnetic tape as a recording medium, wherein helical scanning is executed by a rotary head. However, the present invention is not limited to such an example alone, and an IC memory or the like with a multiplicity of ICs packaged at a high density may be used as a recording medium in the video camera of the present invention, hence realizing an advantage that the power consumption in a recording mode can be reduced remarkably.

Further, a video magnetic head and an audio magnetic head may be provided as recording (and reproducing) heads so as to record (and reproduce) images and sounds respectively by the mutually different magnetic heads, or a single head may be used for magnetically recording both of images and sounds.

One typical example relative to the installation of microphones and the processing of audio signals is such that a total of four microphones are installed in front, rear, left and right, wherein audio signals of four channels are received via the entire microphones, and an audio signal of one channel is obtained by converting the audio signals of two channels received via the left and right microphones out of the audio signals of the entire four channels, and further an audio signal of 0.1 channel is obtained as a surround sound by first extracting the bass components of the audio signals received via the four microphones and then combining the extracted bass components with one another. Thus, the audio signals of a total of 5.1 channels are obtained to thereby ensure the interchangeability with the existing 5.1-channel audio system.

In the above embodiment, the 5.1-channel audio signals are generated out of the four-channel audio signals obtained by converting the audio signals of four channels outputted from the entire four microphones, the one-channel audio signal obtained by converting the audio signals of two channels outputted from the left and right microphones, and the 0.1-channel audio signal. However, a variety of other modified embodiments may be contrived as well. For instance, the number of channels of the audio signals obtained from the four-channel audio signals received via the four microphones may be set to two instead of four channels, and audio reproduction of 3.1 channels may be executed on the basis of the two-channel audio signals, the one-channel audio signal obtained by converting the two-channel audio signals received via the left and right microphones, and the 0.1-channel audio signal.

In the case of attaining interchangeability with the known 5.1-channel audio system for example, microphones for 5.1 channels may be prepared. More specifically, the video camera may be equipped with microphones for 5.1 channels, i.e., four microphones having directivity, and one omnidirectional audio recording microphone having no directivity, wherein the audio signals received via the entire microphones are encoded and modulated to generate audio signals of 5.1 channels, and then the modulated signals are so recorded as to be reproduced in the 5.1-channel audio system.

The above and other features and advantages of the present invention will become apparent from the following description which will be given with reference to the illustrative accompanying drawings.

DESCRIPTION OF THE PREFERRED EMBODIMENTS

Hereinafter the present invention will be described in detail with reference to a preferred embodiment thereof in the accompanying drawings.

Figure 1:
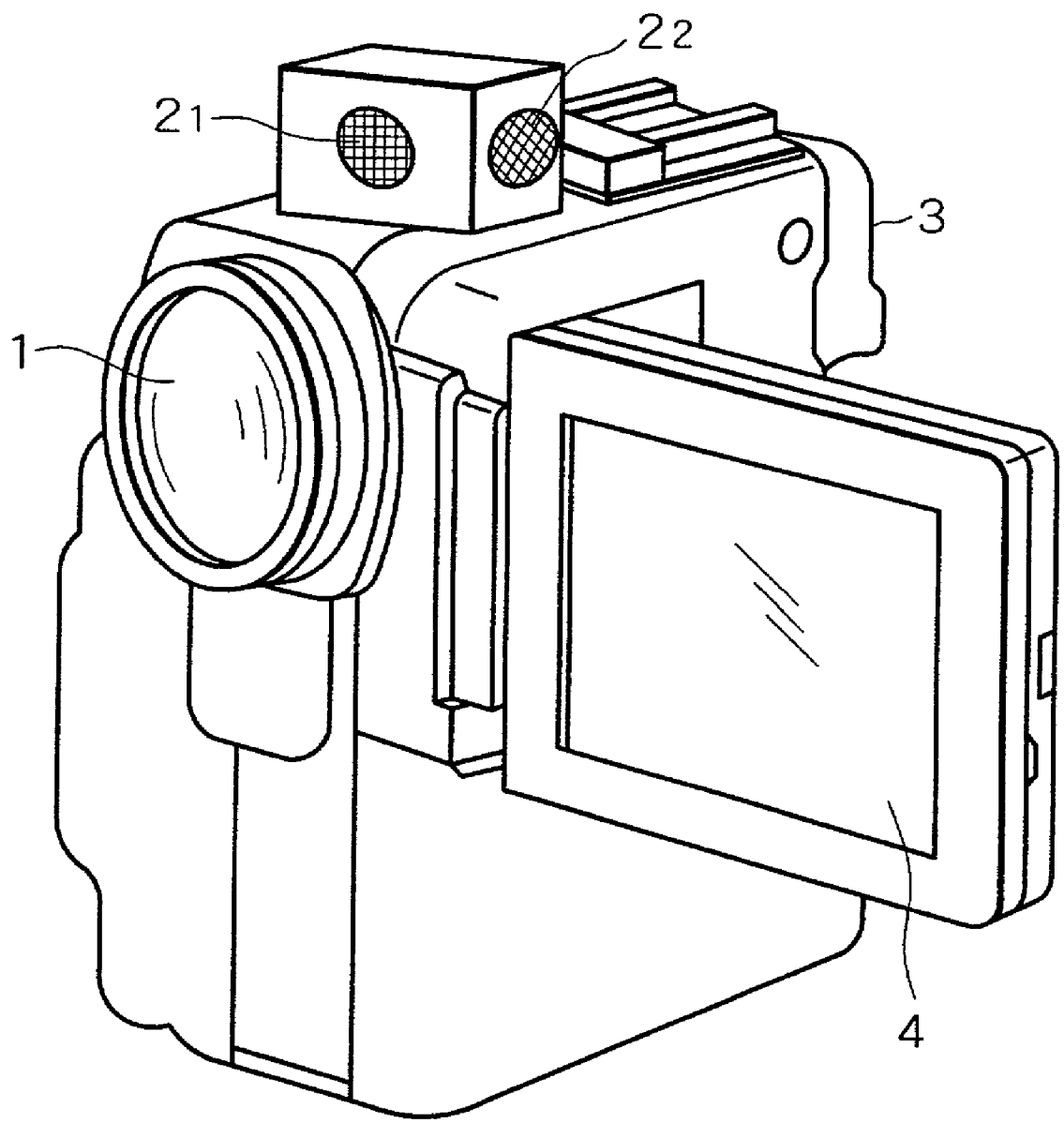
FIG. 1 is a perspective view illustrating the exterior of the video camera of this invention to which the first embodiment of the present invention applied.
Figure 2:
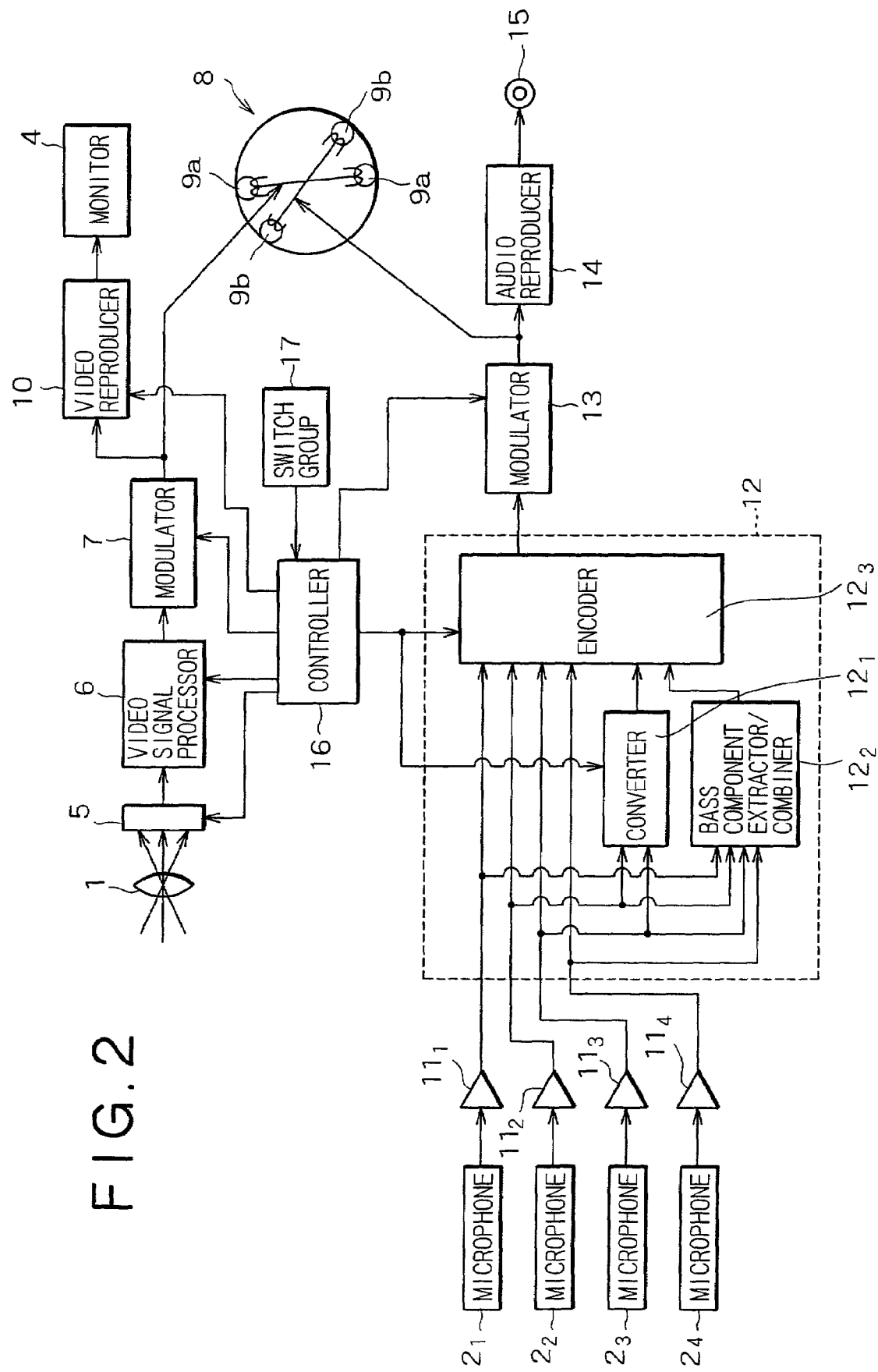
FIG. 2 is a circuit block diagram showing the schematic circuit configuration to which the first embodiment of the present invention applied.

FIGS. 1 and 2 show a first embodiment representing the video camera of the invention, in which FIG. 1 is a perspective view illustrating the exterior of the video camera, and FIG. 2 is a circuit block diagram showing the schematic circuit configuration thereof. First, the external structure will be described with reference to FIG. 1.

In this diagram, there are shown a lens 1 and four microphones $2_1$, $2_2$, $2_3$ and $2_4$. Reference numeral $2_1$ denotes a front microphone positioned in the front; $2_2$ denotes a left microphone positioned on the left (as seen from behind the video camera); $2_3$ denotes a right microphone positioned on the right; and $2_4$ denotes a rear microphone positioned in the rear. In the conventional video camera, even if it is of a type capable of stereophonic recording, merely one microphone is provided on each of the left and right sides. However, in the video camera of the present invention, there are a total of four microphones $2_1$, $2_2$, $2_3$ and $2_4$ (of which only two microphones $2_1$ and $2_2$ are actually illustrated in FIG. 1) Reference numeral 3 denotes a manipulator with manipulating buttons and so forth arrayed thereon, and 4 denotes a monitor consisting of a liquid crystal display for example.

Now the circuit configuration in the video camera will be schematically described below with reference to FIG. 2. Numeral 5 denotes an imaging means such as a solid-state image sensor with a CCD which picks up the image of an object focused on its image pickup plane through the lens 1. Numeral 6 denotes a video signal processor capable of processing the output signal of the solid-state image sensor 5. In case the video camera is a digital one, it is natural that analog-to-digital conversion of digitizing the analog signal is executed in the video signal processor 6. Numeral 7 denotes a modulator which performs frequency modulation (FM) of the video signal outputted from the video signal processor 6 and then transmits the modulated signal to a video magnetic head 9*a* in a helical scanning magnetic recorder/reproducer 8. And the video image is magnetically recorded on a recording medium (magnetic tape) by the magnetic head 9*a*.

Reference numeral 10 denotes a video reproducer capable of demodulating the signal obtained in a recording mode from the modulator 7, or demodulating the video signal read out from the magnetic tape in a reproducing mode by the video magnetic head 9*a*, and further processing the signal in such a manner that the signal can be displayed on the monitor 4 consisting of the liquid crystal display.

Numerals $11_1$, $11_2$, $11_3$ and $11_4$ denote buffer amplifiers for transmitting the output audio signals from the microphones $2_1$, $2_2$, $2_3$ and $2_4$ to an audio signal processor 12 which will be described next. This audio signal processor 12 consists of a converter $12_1$, a bass component extractor/combiner $12_2$ and an encoder $12_3$, and processes the audio signals outputted from the buffer amplifiers $11_1$, $11_2$, $11_3$ and $11_4$.

The converter $12_1$ converts the two-channel audio signals outputted from the left and right microphones $2_2$ and 23 out of the entire four microphones $2_1$, $2_2$, $2_3$, $2_4$ and amplified by the buffer amplifiers $11_2$ and $11_3$, thereby generating an audio signal of one channel for example. The bass component extractor/combiner $12_2$ extracts the base components respectively from the four-channel audio signals outputted from the four microphones $2_1$, $2_2$, $2_3$, $2_4$ and amplified by the buffer amplifiers $11_1$, $11_2$, $11_3$, $11_4$ respectively, and combines the extracted base components of the four-channel audio signals to thereby obtain an audio signal of 0.1 channel.

The encoder $12_3$ encodes the four-channel audio signals outputted from the four microphones $2_1$, $2_2$, $2_3$, $2_4$ and amplified by the buffer amplifiers $11_1$, $11_2$, $11_3$, $11_4$ respectively, and also encodes the 0.1-channel audio signal outputted from the bass component extractor/combiner $12_2$. In case the reproduction line is based on a DVD (digital versatile disk) audio system, the encoding is executed generally by the Dolby AC-3 or the like.

The audio signal processor 12 enables the modulator 13 to modulate the 5.1-channel audio signals and further enables the magnetic head 9b to record the modulated signals on the magnetic tape. It is a matter of course that the video signals are also recorded on the same magnetic tape simultaneously with the audio signals by the function of the video signal line.

The modulator 13 is a circuit for modulating the output of the audio signal processor 12. The output audio signal is sent to the audio magnetic head 9b in the helical scanning magnetic recorder/reproducer 8 and then is recorded on the magnetic tape used as a recording medium. Reference numeral 14 denotes an audio reproducer which demodulates the signal obtained in a recording mode from the modulator 13 or demodulates the video signal read out in a reproduction mode from the magnetic tape by the audio magnetic head 9b, and then processes the audio signal in such a manner that the signal can be reproduced by earphones (not shown) connected to a jack 15.

Reference numeral 16 denotes a controller for controlling the whole video camera. This controller 16 comprises a CPU (central processing unit), a ROM (read only memory), a RAM (random access memory) and so forth. Denoted by 17 is a switch group manipulated by the user to instruct the video camera.

Since this video camera is not characterized with regard to the video signal line, a detailed description thereof is omitted here, and the operation of the characterized audio signal line alone will be described below.

The audio signals obtained through the four front, left, right and rear microphones $2_1$, $2_2$, $2_3$, $2_4$ are inputted via the buffer amplifiers $11_1$, $11_2$, $11_3$, $11_4$ respectively to the audio signal processor 12. That is, the audio signals of four channels are inputted to the audio signal processor 12.

As described, the audio signal processor 12 enables the modulator 13 to modulate the 5.1-channel audio signals and further enables the magnetic head 9b to record the modulated signals on the magnetic tape. And simultaneously therewith, the video signals are also recorded on the same magnetic tape by the magnetic head 9a due to the function of the video signal line.

Consequently, if the magnetic tape thus recorded magnetically is played back by the use of a 5.1-channel audio signal reproducing system, it becomes possible to enjoy the dynamic sounds of 5.1 channels vividly with the live-performance reality.

That is, the ambient omnidirectional bass components around the video camera obtained through the four microphones $2_1$, $2_2$, $2_3$, $2_4$ can be outputted by the exclusive bass surround speaker together with the sounds of the other channels emitted from the other speakers, whereby the sounds including the bass surround sound can be fully appreciated together with the video images while the live-performance reality is achieved.

Therefore, in an exemplary case of shooting the dynamic action of a user's child for example in a children's athletic meeting or the like, it becomes possible to reproduce the surround sounds including the back and ambient cheering shout, hurrah, roar and so forth in addition to the omnidirectional sounds, whereby satisfactory reproduction of the sounds can be attained with sufficient live-performance reality, so that the dynamic video images and the appropriate audio sounds are enjoyable with a vivid impression like the live-performance reality.

The audio signal processor 12 in this embodiment is so contrived as to generate four-channel audio signals from the four microphones $2_1$, $2_2$, $2_3$ and $2_4$, a one-channel audio signal obtained by converting the audio signals from the two left and right microphones $2_2$ and $2_3$ by the converter $12_1$, and a 0.1-channel audio signal outputted from the bass component extractor/combiner $12_2$. However, the circuit of the audio signal processor 12 is not limited to such an example alone.

For example, it may be so modified that a one-channel audio signal is obtained from the microphones by the converter $12_1$, then 3.1-channel audio signals are generated out of such one-channel audio signal, the two-channel audio signals obtained by converting the four-channel audio signals from the entire microphones, and the aforementioned 0.1-channel audio signal, and the modulator 13 is instructed to modulate such 3.1-channel audio signals.

Regarding the microphones, as mentioned above, the video camera may be equipped with microphones corresponding to 5.1 channels, i.e., four microphones having directivity and one omnidirectional audio recording microphone having no directivity, wherein the audio signals received via the entire microphones are encoded to generate 5.1-channel audio signals and, after being modulated and recorded, the signals may be reproduced by a 5.1-channel audio system.

In the embodiment, video magnetic heads and audio magnetic heads are employed individually as recording (and reproducing) heads so that video and audio signals are recorded (and reproduced) separately by the different magnetic heads. However, it is to be understood that the present invention may be altered to a variety of modifications, such that a single magnetic head is usable for recording both video and audio signals.

Thus, according to the video camera of the present invention, its recording operation is so executed that the second audio signal of one channel obtained by processing the audio signals of the entire channels outputted from the plural microphones can be reproduced independently and separately from the first audio signals of plural channels obtained by processing the audio signals outputted from the entire microphones. Therefore, regardless of whether the reproduction is executed in this video camera or some other reproducing apparatus, it is possible to achieve satisfactory audio reproduction with complete live-performance reality simultaneously with the video reproduction. Accordingly, for example, the dynamic action of a user's child in a children's athletic meeting or the like can be reproduced together with the surround sounds including the back and ambient cheering shout, hurrah, roar and so forth in addition to the omnidirectional sounds while the high live-performance reality is attained. Consequently, it becomes possible to enjoy the recorded images and sounds by fully utilizing the function of a home video/audio reproducing apparatus.

Further according to the video camera of the present invention, ambient omnidirectional sounds can be caught separately from the discrete directional sounds without the necessity of any exclusive surround sound recording microphone, and in a reproduction mode, the surround sounds can be reproduced by independent speakers with emphasis of the bass components thereof.

While the preferred embodiments of the present invention have been described using the specific terms, such description is for illustrative purposes only, and it is to be understood that changes and variations may be made without departing from the spirit or scope of the following claims.

What is claimed is:

1. A video camera having a multi-channel audio signal processor for recording and/or reproducing audio signals of a plurality of channels and video signals simultaneously in a single recording medium, the video camera comprising:

first, second, third, and fourth microphones producing, respectively, front, rear, left, and right channel audio signals;

converting means for converting audio signals of the left channel and the right channel selected from said front, rear, left, and right channel audio signals from said first, second, third, and fourth microphones into an audio signal of one channel;

means for extracting a bass component from each of said front, rear, left, and right channel audio signals from said first, second, third, and fourth microphones and for combining the extracted bass components to produce a bass audio signal of one channel; and encoding means for encoding to one channel audio signal said front, rear, left, and right channel audio signals from said first, second, third, and fourth microphones and said audio signal of one channel from said converting means and said bass audio signal of said one channel, wherein said one-channel output signal from said encoding means is recorded in said single recording medium.

* * * * *